F. H. SAFFELL.
TRAP FOR BEEHIVES.
APPLICATION FILED JULY 15, 1908.
917,900.
Patented Apr. 13, 1909.
2 SHEETS—SHEET 1.
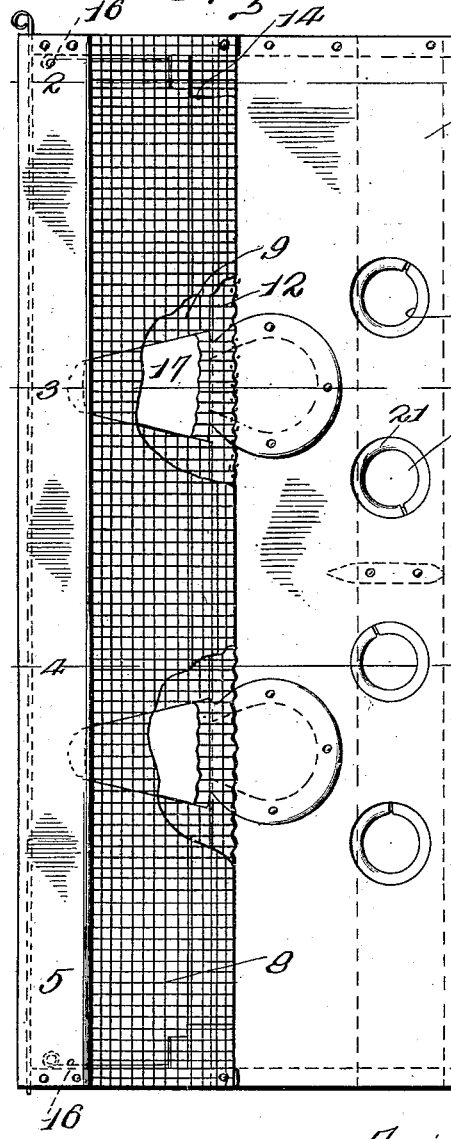
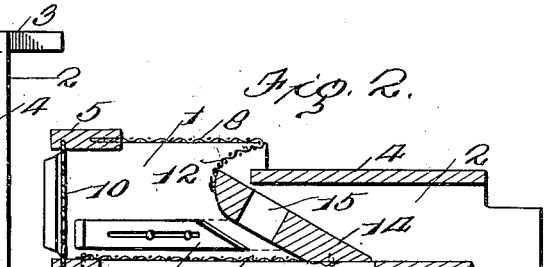
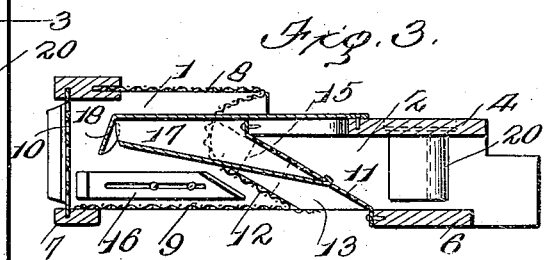
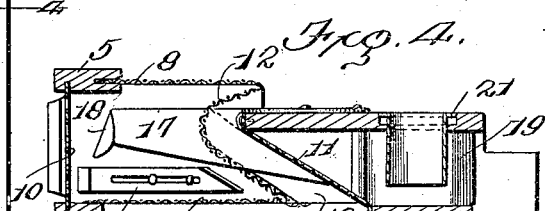
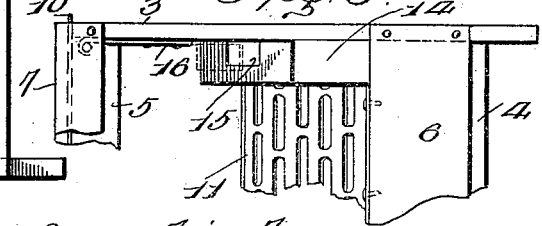
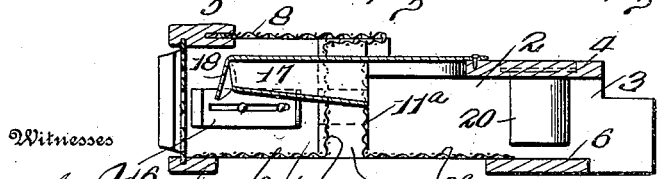
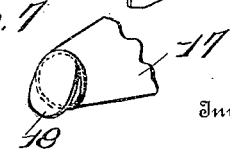
Witnesses
Inventor
Frank H. Saffell
By
Attorneys F. H. SAFFELL.
TRAP FOR BEEHIVES.
APPLICATION FILED JULY 15, 1908.
917,900.
Patented Apr. 13, 1909.
2 SHEETS—SHEET 2.
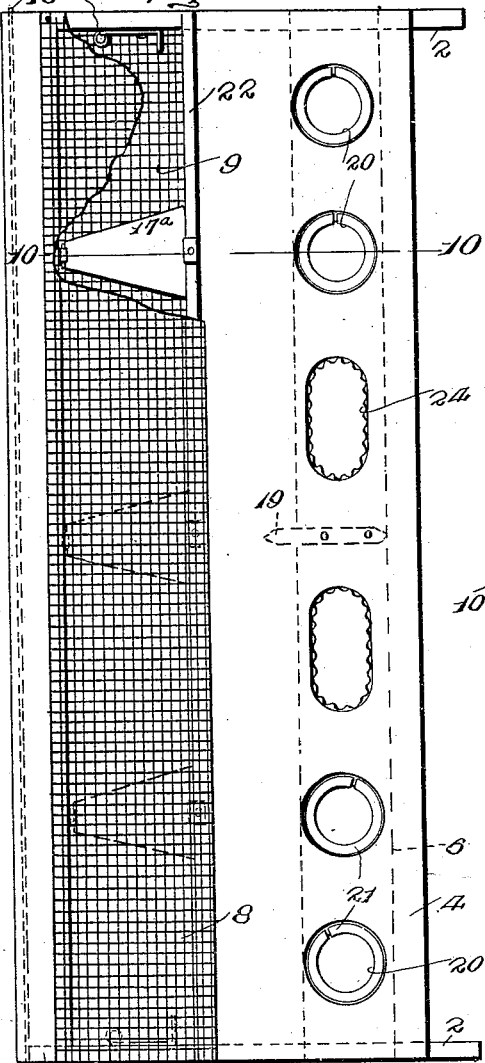
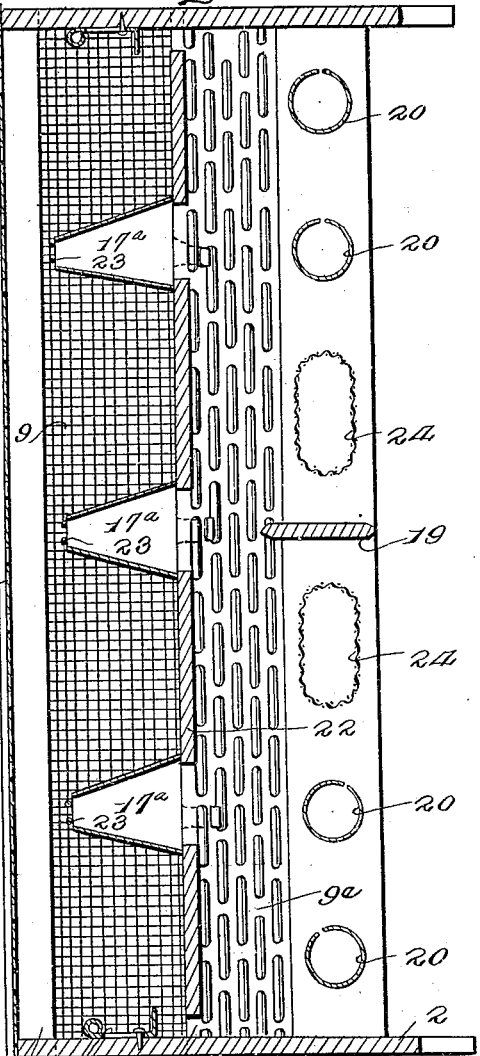
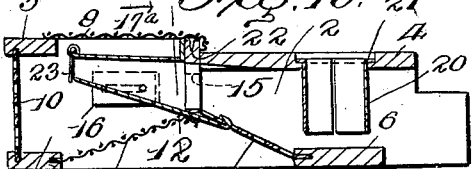
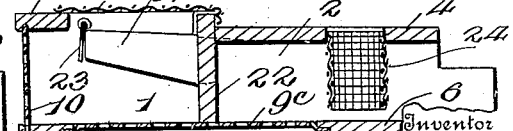
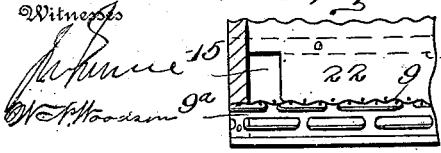
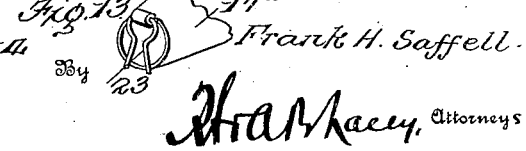

UNITED STATES PATENT OFFICE.

FRANK H. SAFFELL, OF ALEXANDRIA, VIRGINIA.

TRAP FOR BEEHIVES.

No. 917,900.

Specification of Letters Patent.

Patented April 13, 1909.

Application filed July 15, 1908. Serial No. 443,672.

*To all whom it may concern:*

Be it known that I, FRANK H. SAFFELL, a citizen of the United States, residing at Alexandria, in the county of Alexandria and State of Virginia, have invented certain new and useful Improvements in Traps for Beehives, of which the following is a specification.

The present invention relates to means for separating the drones and queen bee from the worker bees and for confining the queen bee to prevent swarming of the colony, and aims to provide a novel form of trap which involves a simple, effective, compact and light structure which is easily accessible in every part for cleaning or any desired purpose.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of a trap embodying the invention, parts being broken away. Fig. 2 is a transverse section on the line 2—2 of Fig. 1. Fig. 3 is a cross section on the line 3—3 of Fig. 1. Fig. 4 is a cross section on the line 4—4 of Fig. 1. Fig. 5 is a detail view of an end portion of the trap inverted, showing more clearly the cut-off for controlling the passage between the entrance and confining chambers. Fig. 6 is a transverse section of a modification. Fig. 7 is a detail view of the contracted end of the tapered tube establishing communication between the entrance and confining chambers. Fig. 8 is a top plan view of a modified form of trap. Fig. 9 is a horizontal section thereof. Fig. 10 is a transverse section on the line 10—10 of Fig. 8. Fig. 11 is a cross section of a further modification.
Fig. 12 is a detail view of an end portion of the trap on the line 12—12 of Fig. 10. Fig. 13 is a detail view of the inner end of the tapered tube showing the pivoted guard.

Corresponding and like parts are referred to in the following description and indicated in all the views of the drawings by the same reference characters.

The trap comprises two chambers 1 and 2 designated, respectively, as the confining chamber and the entrance chamber according to their respective functions. The entrance chamber 2 affords ready ingress and egress for the worker bees and under certain conditions may also admit of the drones and queen bee entering and leaving the hive. The trap as a whole is light in structure, and formed of light wood, such as pine and meshed or foraminous metal, the several parts being secured by brads or other suitable fastenings. The trap comprises end pieces 3, top strips 4 and 5, bottom strips 6 and 7, a top section 8 of wire fabric, a bottom section 9 of like material and a slide 10, the latter retained in place by grooves formed in the strips 5 and 7 near their outer edges, said slide admitting of ready access to the confining chamber when required for any purpose. As shown most clearly in Figs. 3 and 4, the chambers 1 and 2 are separated by means of partitions 11 and 12. The partition 11 inclines from the bottom strip 6 to the top strip 4 and is of foraminous material so as to admit of the worker bees having free ingress and egress to the openings thereof. The partition 12 is of meshed fabric such as wire and is curved between its top and bottom edges and is spaced from the partition 11 to form a passage 13 through which the worker bees may travel. The top section 8 of the trap is higher than the top section 4 and overlaps the latter a short distance. The upper portion of the curved partition 12 joins the rear edge of the top section 8 and overhangs the front portion of the top section 4, hence the bees must alight upon the section 4 preliminary to entering the passage 13. A block is located at each end of the trap in the space formed between the partitions 11 and 12, and the end portions of said partitions are connected thereto. Each block 14 has an opening 15 of a size to admit of the queen bee and drones passing therethrough from one chamber to the other. A cut-off 16 is adapted to close the opening 15, thereby retaining the queen bee and drones in the chamber 1 when required. The cut-off 16 consists of a strip of metal having an end portion bent to close the opening 15 and the opposite end portion is longitudinally slotted to receive fastenings by means of which the cut-off is held in place and directed in its movements. The outer end of the cut-off 16 is bent to form a finger piece for convenience in operating the cut-off. Movement of the slide 10 admits of the cut-off being reached for adjustment of movement either to cover the opening 15 or to uncover said opening, as may be required.

Tapered tubes 17 establish communication between the chambers 1 and 2 and extend across the passage or space 13. The outer end of the tube 17 is connected to the top section 4 and partition 11. The smaller end extends some distance into the confining chamber 1 and terminates in a guard 18 which retards the return of the queen bee or drones after the same have once entered the chamber 1. The guard 18 is a part of the sheet metal or other material forming the tube 17 and inclines downward from the top, the arrangement being such as to practically prevent the return of the bees through the tube 17 after once entering the chamber 1. There may be as many tubes 17 as desired.

The strips 4 and 6 are light and are braced by one or more stay pieces 19 which are attached to each. Tubes 20 are fitted into openings formed in the top section 4 and are retained in place in said openings in any desired manner. There may be as many tubes 20 as desired to insure ready ingress and egress of the worker bees. The tubes 20 have outer flanges 21 at their upper ends which overlap the openings in the top section 4 so as to support the tubes in proper position. The openings in the top section 4 are enlarged at their upper ends to receive the flanges 21 of the tubes and prevent the upper ends of said tubes projecting above the section 4 when said tubes are elevated to provide ample space between their lower ends and the bottom strip 6 for the passage of the queen bee and drones when it is desired that such bees, in addition to the workers, should have unobstructed ingress and egress to the hive through the trap. When the tubes 20 are lowered, as indicated in Figs. 3 and 6, the spaces between their lower ends and the bottom strip 6 is such as to admit of the passage of the worker bees only and to obstruct the passage of the queen bee or drones. But when the tubes 20 are elevated, as indicated in Fig. 4, the space between the strip 6 and the lower ends of the tubes 20 is such as to admit of both the queen bee and drones having free entrance and exit. It will be understood that when the tubes 20 are lowered, the worker bees only may enter and leave the hive through the trap, the queen bee and drones being confined. When the cut-offs 16 are moved outward to uncover the openings 15 the queen bee and drones may pass from the hive through the entrance chamber 2 into the confining chamber 1 and may be detained in the latter chamber by closing the openings 15 by means of the cut-offs 16.

Any worker bees entering the chamber 1 may pass outward therefrom through the openings in the slide 10, which openings are of a size similar to the openings in the partition 11 to obstruct the passage of the queen bee and drones, while admitting of the passage of the worker bees.

In the modification shown in Fig. 6, the block 14 at each end of the passage or space between the adjacent walls of the chambers 1 and 2 has a vertical arrangement and the partitions 11 and 12 are replaced by vertical partitions $11^a$ and $12^a$. The space or passage between the partitions $11^a$ and $12^a$ is vertical and a second bottom section $9^a$ is provided and extends from the bottom strip 6 to the lower edge of the partition $11^a$. In all other particulars the construction is substantially the same as hereinbefore set forth and shown in the preceding views.

In the modifications shown in Figs. 8 to 11, inclusive, the chambers 1 and 2 are separated by means of a vertical partition 22 in the end portions of which openings 15 are formed and closed by means of cut-offs 16 in the manner and for the purpose stated. Tapered tubes $17^a$ are secured to the partition 22 and extend into the confining chamber 1, their smaller ends being provided with pivoted guards 23 which are adapted to open to admit of the bees leaving the tubes and entering the chamber 1 and which close downward to effectually prevent the return of the bees through the said tubes. The bottom sections 9—$9^a$ may incline oppositely, as indicated in Fig. 10, and may be of different material, or said bottom section may be straight and consist of a single piece of material, as indicated at $9^c$ in Fig. 11. In the latter case the partition 22 is deeper than the partition shown in Fig. 10. In addition to the tubes 20, other tubes 24 are provided, the same being oblong and constructed of wire fabric. The tubes 24 may be held in place either by friction or in any desired way. The tubes 24 may be adjusted vertically similar to the tubes 20 and for a like purpose. The tubes 20 are shown split and their normal tendency is to spring outward and thereby engage frictionally with the sides of the openings so as to be retained in the adjusted position by frictional engagement.

When the trap is fitted to a hive, the bees can enter and leave the hive only through said trap. When the tubes 20 and 24 are elevated, all bees may readily enter and leave the hive, but when said tubes are lowered, the worker bees alone may enter and leave the hive, the queen bee and drones being confined either to the hive or to the trap. When the cut-offs 16 are moved to uncover the openings 15, all bees may have unobstructed ingress between the chambers 1 and 2 and when said openings 15 are closed by the cut-offs 16, the queen bee and drones in the chamber 1 are confined therein to be disposed of as may be found most advantageous.

Having thus described the invention, what is claimed as new is:

1. A trap for bee hives, comprising separate chambers, the one admitting of ingress and egress, the other serving to confine the queen bee and drones, and a tapered tube establishing communication between the two chambers and having its tapered end projected into the confining chamber and having at its smaller end a guard to prevent the return of the bees therethrough after entering the said confining chamber.

2. In a trap for bee hives, comprising separate chambers, one affording ready ingress and egress and the other serving to confine the queen bee and drones, a passage between the two chambers, and a cut-off for closing said passage to retain the bees in the confining chamber after entering the same.

3. In a trap for bee hives, comprising an entrance chamber and a confining chamber, tapered tubes affording communication between the two chambers and having their tapered ends extended into the confining chamber and provided with guards to prevent the return of the bees thereto, the part separating the two chambers having an opening through which the bees have ready passage in each direction, and a cut-off for said opening to retain the bees in said confining chamber.

4. In a trap for bee hives, comprising an entrance chamber and having openings formed in a confining portion of said chamber, and tubes adjustable in said openings to regulate and limit the entrance and exit of the bees.

5. In a trap for bee hives, comprising an entrance chamber and having an opening in a confining side thereof and having the outer portion of said opening enlarged, a tube fitted in said opening and adjustable therein and having an outer flange at one end to enter the enlarged portion of the said opening.

6. A trap for bee hives, comprising entrance and confining chambers spaced apart to leave a passage between them from top to bottom, tubes extending across the space formed between said chambers and opening into each, said tubes projecting into the confining chamber and having guards at their exit ends.

7. A trap for bee hives, comprising entrance and confining chambers spaced apart to leave a passage between them from top to bottom, the wall of the confining chamber extending over the space formed between the two chambers and overhanging the entrance chamber, but spaced therefrom, and tubes extending across the space formed between the two chambers and projecting into the confining chamber and provided with guards at their exit ends.

In testimony whereof I affix my signature in presence of two witnesses.

FRANK H. SAFFELL. [L. S.]

Witnesses:
  V. B. HILLYARD,
  W. N. WOODSON.